United States Patent [19]

Kato et al.

[11] Patent Number: 4,648,024

[45] Date of Patent: Mar. 3, 1987

[54] CURVILINEAR INTERPOLATION SYSTEM AND METHOD

[75] Inventors: Kiyotaka Kato; Michitaka Oshima, both of Osaka, Japan

[73] Assignee: Mitsubishi Denki Kabushiki Kaisha, Japan

[21] Appl. No.: 671,829

[22] Filed: Nov. 15, 1984

[30] Foreign Application Priority Data

Nov. 15, 1983 [JP] Japan .................................. 58-214701

[51] Int. Cl.$^4$ ...................... G05B 19/18; G05B 19/25; G06F 15/46

[52] U.S. Cl. ..................................... 364/169; 364/168; 364/474; 318/570; 318/573

[58] Field of Search ............... 364/169, 167, 168, 172, 364/194, 474, 577, 723; 318/569, 570, 573, 601

[56] References Cited

U.S. PATENT DOCUMENTS

| | | | |
|---|---|---|---|
| 3,806,713 | 4/1974 | Ryberg | 364/169 |
| 3,969,615 | 7/1976 | Bowes et al. | 364/169 |
| 4,031,369 | 6/1977 | Heaman et al. | 364/169 |
| 4,423,481 | 12/1983 | Reid-Green | 364/169 |
| 4,493,032 | 1/1985 | Johnson | 364/474 |
| 4,507,738 | 3/1985 | Nozawa et al. | 364/474 |
| 4,546,427 | 10/1985 | Kishi et al. | 364/168 |
| 4,550,383 | 10/1985 | Sugimoto | 364/169 X |
| 4,581,698 | 4/1986 | Jaswa | 364/169 |

Primary Examiner—Jerry Smith
Assistant Examiner—Jon D. Grossman
Attorney, Agent, or Firm—Sughrue, Mion, Zinn, Macpeak and Seas

[57] ABSTRACT

A curvilinear interpolation system and method for use in a numerical control apparatus such as a machine tool or a robot having two or more drive axes and movable while effecting linear interpolation on a given curve with a plurality of line segments. For each line segment a curvature $K_p$ of the curve is calculated at a current curve interpolating point $P_p$, and a curvature $K_n$ calculated at a point $P_n$ on the curve spaced a given search length $l_S$ from the point $P_p$ along the curve. Then, a curvature $K_s$ is set equal to $K_p$ when $K_p \geq K_n$ and set equal to $K_n$ when $K_p < K_n$. The curvature $K_s$ is compared with a limit curvature $K_L$ established for determining whether a curve portion is a straight line or an arc for establishing the curve portion as an arc having the curvature $K_s$ when $K_s \geq K_L$ to approximate the curve portion with a line segment so as to fall within an allowable error t and for establishing the curved portion as a straight line when $K_s < K_L$ to approximate the curve portion with a line segment of a prescribed length. An operative member such as a robot arm is then moved along a path defined by the plurality of line segments thereby calculated.

2 Claims, 19 Drawing Figures

CURVILINEAR INTERPOLATION SYSTEM AND METHOD

BACKGROUND OF THE INVENTION

The present invention relates to a curvilinear interpolation system and method for a numerical control apparatus such as a machine tool or a robot having two or more drive axes and movable while effecting linear interpolation on a given curve with a plurality of line segments.

It is difficult to numerically control a machine tool or robot so as to move without error along a curve defined in a two- or three-dimensional space. Therefore, it has been the customary practice to approximate the curve with a number of short line segments within a given allowable error for curvilinear interpolation control. FIG. 1 of the accompanying drawings is illustrative of such curvilinear interpolation control. A given curve Li is approximated by line segments $P_0P_1$, $P_1P_2$, $P_2P_3$, $P_3P_4$, $P_4P_5$. It is here assumed that maximum errors between the line segments and the ideal curve Li are $t_1$, $t_2$, $t_3$, $t_4$, $t_5$, respectively, and an allowable error (tolerance) is $\tau$. It is desirable for curvilinear interpolation that all of these maximum errors $t_1$, $t_2$, $t_3$, $t_4$, $t_5$ be smaller than the tolerance.

Two methods which have conventionally been employed for the curvilinear interpolation will be described.

FIG. 2 illustrates the first method. On the ideal curve Li, from a starting point $P_0$, a group of points $P_1$ to $P_6$ are spaced at constant intervals. First, a maximum error $t_1$ between a line segment $P_0P_1$ and the curve Li is compared with a tolerance $\tau$. Since $t_1 \leq \tau$, the point $P_1$ is skipped. Then, the points $P_1$ to $P_6$ are successively checked, and it is assumed that $t_6 > \tau$ is achieved for the first time for the line segment $P_0P_6$. An interpolation point next to the point $P_0$ is then determined as the point $P_5$, which is one point prior to the point $P_6$. Then, the point $P_5$ is set as a new starting point. In this manner, successive interpolated line segments are determined. This method is capable of effecting polygonally approximated interpolation in which the tolerance $\tau$ is ensured. However, it is disadvantageous in that the time required for calculation is long since a number of points must be successively checked, and it is not easy for the operator to determine how close the points should be established.

According to the second method, interpolating points are determined using the curvature of a given curve as shown in FIGS. 3 through 6. FIG. 3 is illustrative of the relationship between the radius of curvature $\tau$ of a curve Li having the form of an arc, the length d of an approximating line segment, and points where the curve Li is divided by the approximating line. It is assumed that the point C is the center of curvature of the arc, the line segment $P_1P_2$ is the approximating line segment, and the points of intersection between a bisector of the angle $\angle P_1CP_2$ and the curve Li and between this bisector and the line segment $P_1P_2$ are $P_A$ and $P_B$, respectively. At this time, $$\overline{(P_1P_2/2)}^2 + \overline{(P_BC)}^2 = \overline{(P_1C)}^2$$

Since $\overline{P_1P_2} = d$, $\overline{P_BC} = \rho - t$, $\overline{P_1C} = \rho$, $$t^2 - 2\rho t + d^2/4 = 0 \quad (1)$$

and $$d = 2\sqrt{2\rho t - t^2} \quad (2)$$

Equation (2) gives a maximum line segment length $\Delta S$ at the time of approximating the arc having the radius $\rho$ of curvature with a line segment when the tolerance $\tau$ is given. That is, $$\Delta S = 2\sqrt{2\rho\tau - \tau^2} \quad (3)$$

The tolerance is ensured if the line segment has a length of $\Delta S$ or smaller.

In general, in the second method a given curve is considered as being composed of a succession of arcs including an arc having an infinite radius of curvature, and such a curve is subjected to linear interpolation. For the sake of simplicity, the second method will be described with reference to curves composed only of a straight line and curves on a two-dimensional plane.

FIG. 4 is explanatory of interpolation of a curve Li made up of an arc having a center of curvature C1 and a radius of curvature $\rho_1$ and an arc having a center of curvature C2 and a radius of curvature $\rho_2$, the arcs blending smoothly with each other at a point $P_5$. From equation (3), the length $\Delta S_1$ of a line segment for the arc having the radius of curvature $\rho_1$ is $\Delta S_1 = 2\sqrt{2\rho_1\tau - \tau^2}$, and the length $\Delta S_2$ of a line segment for the arc having the radius of curvature $\rho_2$ is $\Delta S_2 = 2\sqrt{2\rho_2\tau - \tau^2}$. $\overline{P_1P_2}$, $\overline{P_2P_3}$, $\overline{P_3P_4}$ and $\overline{P_4P_5}$ are approximated by the line segment having the length $\Delta S_1$, and $\overline{P_5P_6}$, $\overline{P_6P_7}$ and $\overline{P_7P_8}$ are approximated by the line segment having the length $\Delta S_2$, thus achieving linear interpolation in which the tolerance is ensured.

This method, however, has the following shortcoming: In FIG. 5, an arc having a radius of curvature $\rho_1$ and an arc having a radius of curvature $\rho_2$ are joined at a point $P_C$. Interpolating points are determined from a starting point $P_0$ by line segments $P_0P_1$, $P_1P_2$, $P_2P_3$, $P_3P_4$ and $P_4P_5$ having the length $S_1 = 2\sqrt{2\rho_1\tau - \tau^2}$. The length of a line segment at a point $P_5$ is also $\Delta S_1$ since $P_5P_C$ is an arc having the radius of curvature $\rho_1$. If a next point $P_6$ is determined as being on an arc having the radius of curvature $\rho_2$, then a curve portion $P_5P_CP_6$ is approximated by a line segment $P_5P_6$ for which no tolerance $\tau$ is ensured.

FIG. 6 is illustrative of interpolation of a curve Li composed of a straight line joined smoothly at a point $P_C$ with an arc having a center of curvature C and a radius of curvature $\rho$. The length of a line segment which approximates the straight line is infinite from the equation (3). Therefore, a maximum line segment length $l_L$ is established, and the operator is allowed to select such a maximum line segment length. However, it is troublesome for the operator to ascertain the setting of the maximum line segment length $l_L$ and hence inconvenient to handle the same. Where the straight line is approximated with line segments $P_1P_2$, $P_2P_3$ and $P_3P_4$ having the length $l_L$, a next point $P_4$ is determined with the length $l_L$ since the point $P_4$ is on the straight line, with the result that no tolerance $\tau$ is ensured. This is because the arc has to be approximated with line segments having a length of $l_S$ or smaller calculated by $l_S = 2\sqrt{2\rho\tau - \tau^2}$ with $l_L > l_S$.

As discussed above, the second method has a shorter time for calculation than the first method and lends itself to high-speed processing, but is incapable of performing accurate curvilinear interpolation unless the above deficiencies are eliminated.

SUMMARY OF THE INVENTION

It is an object of the present invention to provide a system and method for effecting curvilinear interpolation at a high speed with a high accuracy.

In accordance with the invention, a curve is expressed by a vector:

$$P(S) = [x(S), y(S), z(S)] \qquad (4)$$

using a curvelength S. Generally, a minute portion of a given curve is considered as an arc having a radius of curvature given by:

$$\rho = 1 / \left| \frac{\partial^2 P(S)}{\partial S^2} \right|, \qquad (5)$$

and the curve is considered as a succession of such minute arcs. Designated by $\rho$ is the radius of curvature, and its reciprocal:

$$K = 1/\rho \qquad (6)$$

called the curvature.

DESCRIPTION OF THE PREFERRED EMBODIMENTS

Figure 1:
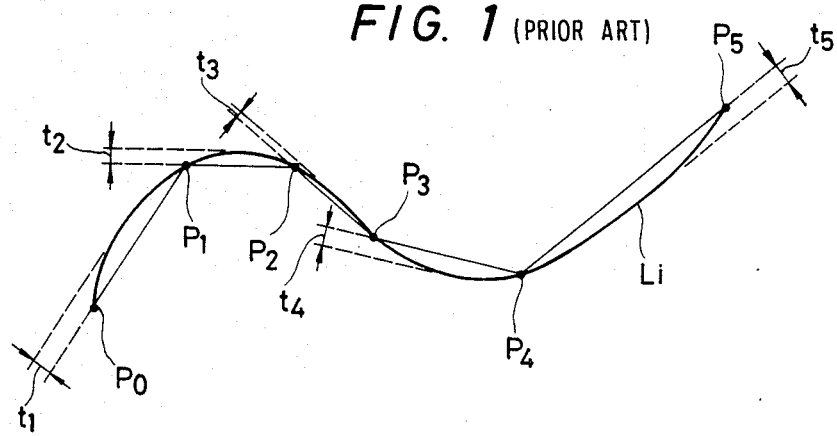
FIG. 1 is a diagram illustrative of conventional interpolation of a curve through linear interpolation.
Figure 2:
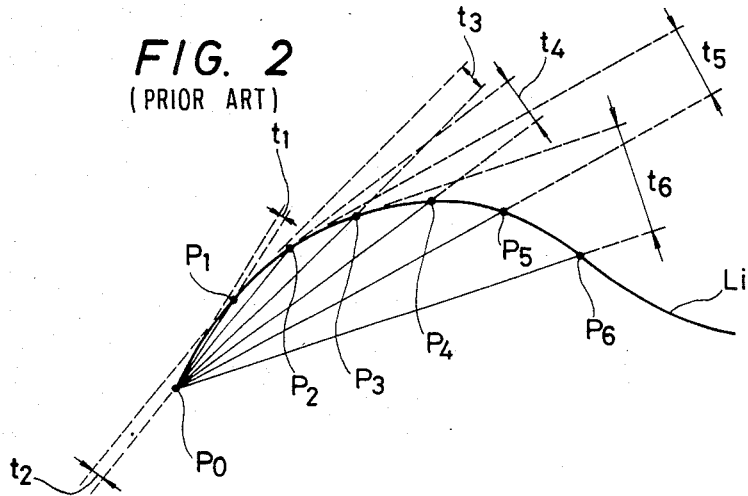
FIGS. 2 through 6 are diagrams explanatory of conventional interpolation methods and their shortcomings.
Figure 3:
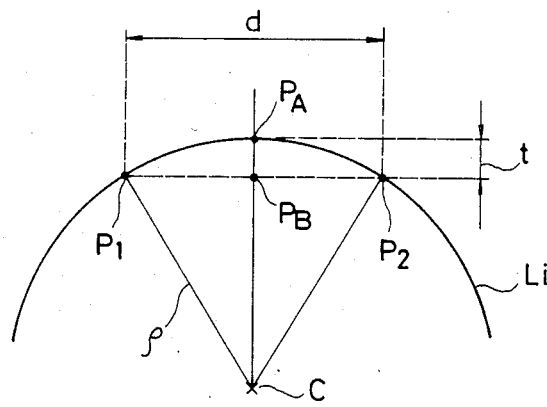
Figure 4:
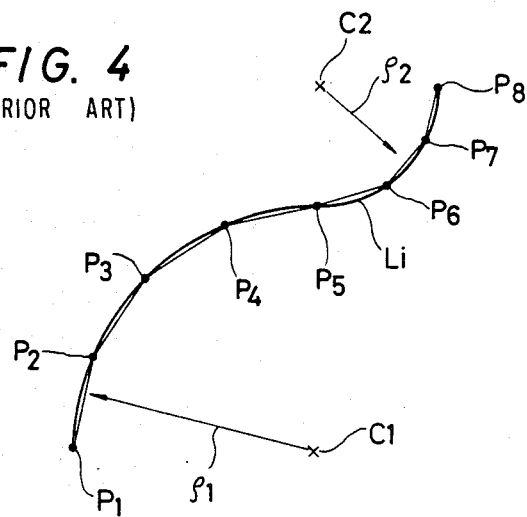

Designated in the drawings at 1 is a data input unit, 2 a memory, 3 a control circuit, 4 a servo circuit for driving various axes, and 5 a machine tool.

Identical or corresponding reference characters denote identical or corresponding parts throughout the views.

Figure 7:
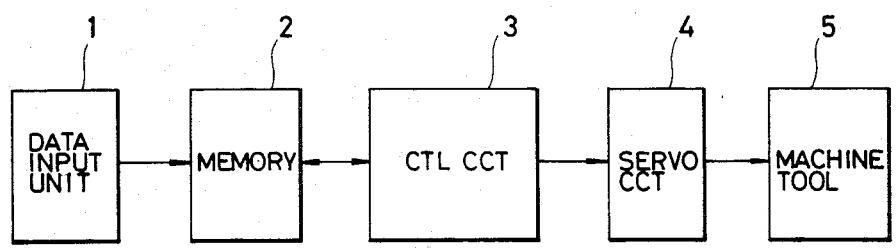
FIG. 7 is a block diagram of a system according to the present invention.
Figure 8:
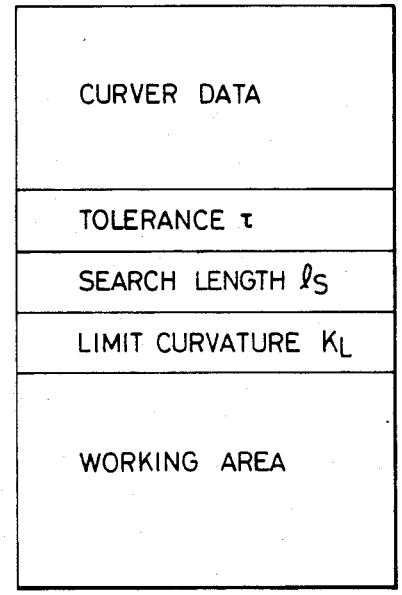
FIG. 8 is a diagram showing memory regions.
Figure 9:
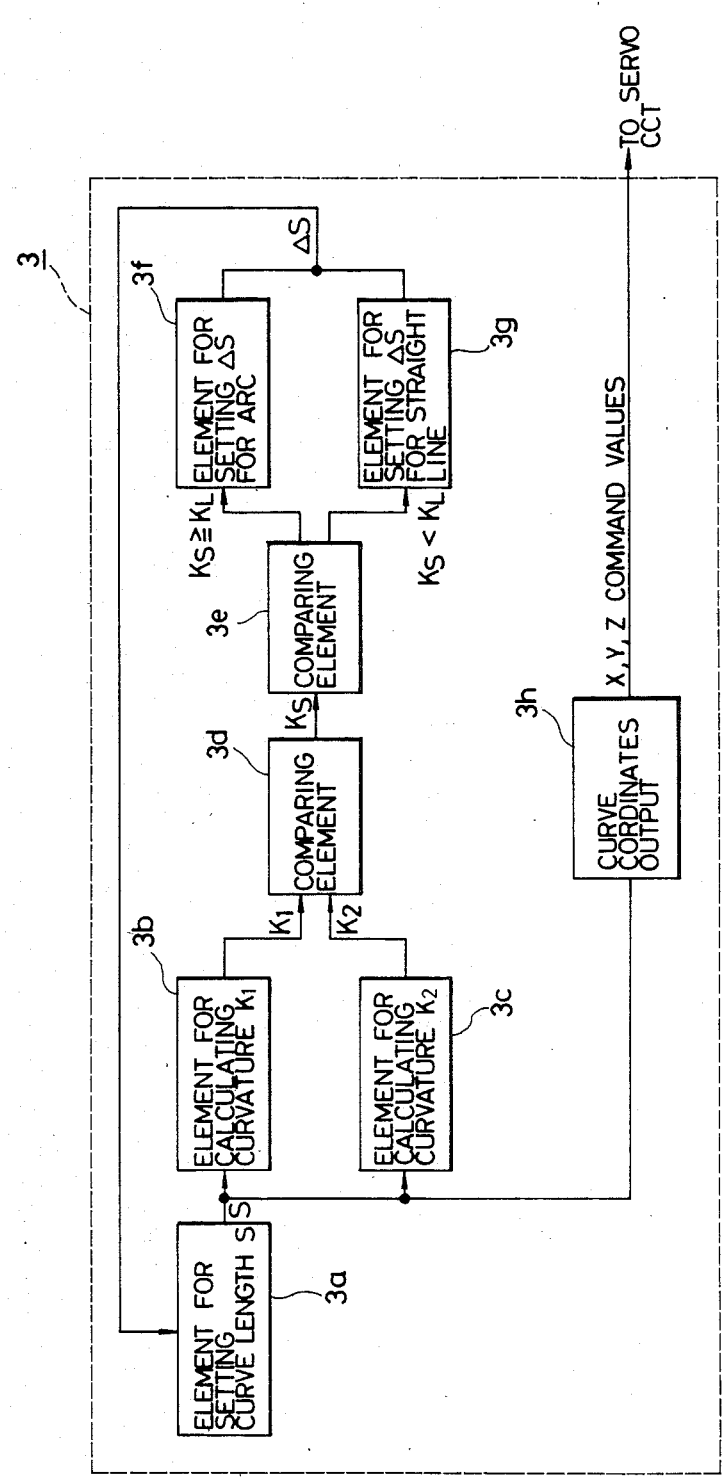
FIG. 9 is a block diagram of a control circuit in the system of FIG. 7.

FIG. 7 is a block diagram of a curvilinear interpolation system according to a preferred embodiment of the present invention. The system includes a data input unit 1 through which the operator enters data items on the shape of a curve, a tolerance $\tau$, and a search length $l_S$, a memory 2 for storing the data on the shape of the curve, the tolerance $\tau$, and the search length $l_S$ in the pattern shown in FIG. 8 and also storing data used by a control circuit, a control circuit 3 for issuing coordinate command values to a servo circuit 4 for driving various axes, the servo circuit 4 controlling a machine tool 5 to reach the applied command values. The control circuit 3 is implemented with a microprocessor including operative elements as shown in FIG. 9. In FIG. 9, the control circuit 3 is composed of an element 3a supplied with the length $\Delta S$ of a next approximating line segment for issuing a current curve length S, an element 3b for calculating a radius of curvature $K_1$ in the curve length S, an element 3c for calculating a radius of curvature $K_2$ in the curve length $S+l_S$ (search length $l_S$), an element 3d for comparing the radii of curvature $K_1$ and $K_2$ and setting a larger radius of curvature to $K_S$, an element 3e for comparing the value of the radius of curvature $K_S$ with a limit radius of curvature $K_L$ which determines whether the portion having the radius of curvature $K_S$ is a straight line or an arc, an element 3f for calculating a line segment length S when the current curve portion is determined as an arc, an element 3g for calculating a line segment length S when the current curve portion is determined as a straight line, and an output unit 3h for calculating coordinate values of the curve from the curve length S and issuing them as X, Y, Z command values to the servo circuit 4.

Figure 10:
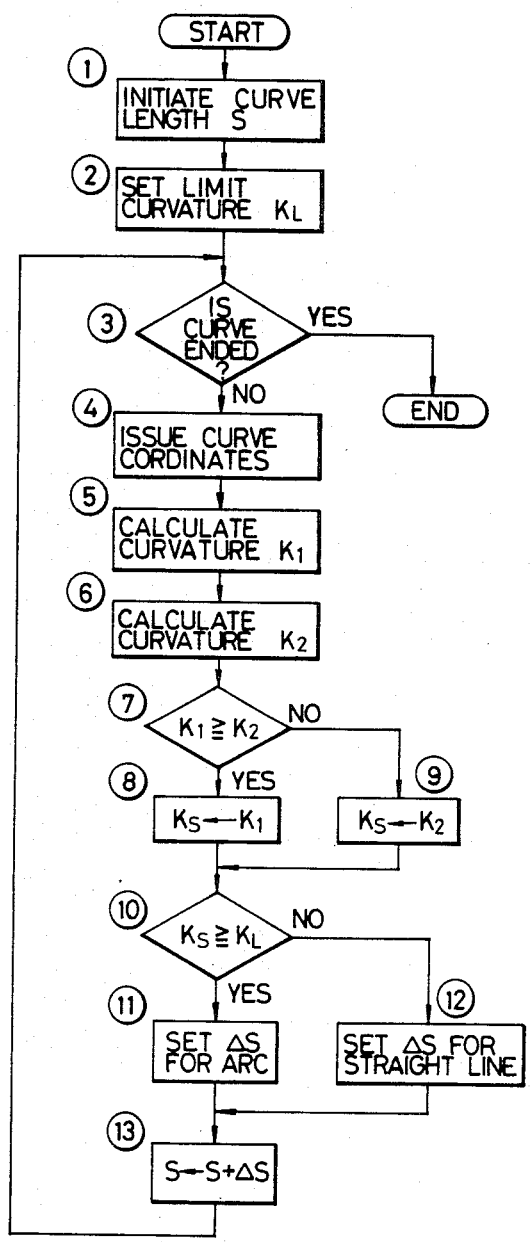
FIG. 10 is a flowchart of successive steps of operation of the system of the invention.

Operation of the system thus constructed according to the present invention will be described with reference to the flowchart of FIG. 10. First, the curve length S is initialized in a step (1) by enabling the element 3a to set S=0. Then, the limit curvature $K_L$ is set in a step (2). As described below, the search length $l_S$ is employed to check the condition of the curve in units of this length, and is appropriately selected by the operator dependent on the condition of the curve. No line segment is allowed which has a length in excess of the unit search length. If the limit radius of curvature $K_L$ is established from the equation (1) as:

$$K_L = \frac{1}{\rho L} = \frac{8\tau}{4\tau^2 + l_S^2}, \qquad (7)$$

then the curve may be regarded as an arc when the radius of curvature is greater than $K_L$ and as a straight line when the radius of curvature is smaller than $K_L$. When regarded as a straight line, the maximum allowable error is smaller than the tolerance if the line segment length is $l_S$. Then, a step (3) determines whether the curve is finished or not. If the curve length S exceeds a certain value, then the program ends, and if not, the program goes to a next step. The element 3h calculates the coordinate values of the current curve from the current curve length S and issues them as command values to the servo circuit in a step (4). A step (5) calculates a radius of curvature $K_1$ in the curve portion having the current curve length S, and a step (6) calculates a radius of curvature $K_2$ in the curve portion having the curve length $S+l_S$ which is spaced the search length $l_S$ from the current curve portion. A step (7) compares the radii of curvature $K_1$ and $K_2$ and selects the larger one, and a step (7) sets the selected radius of curvature as $K_S$. The steps (7) and (8) will be described in greater detail below.

Figure 11:
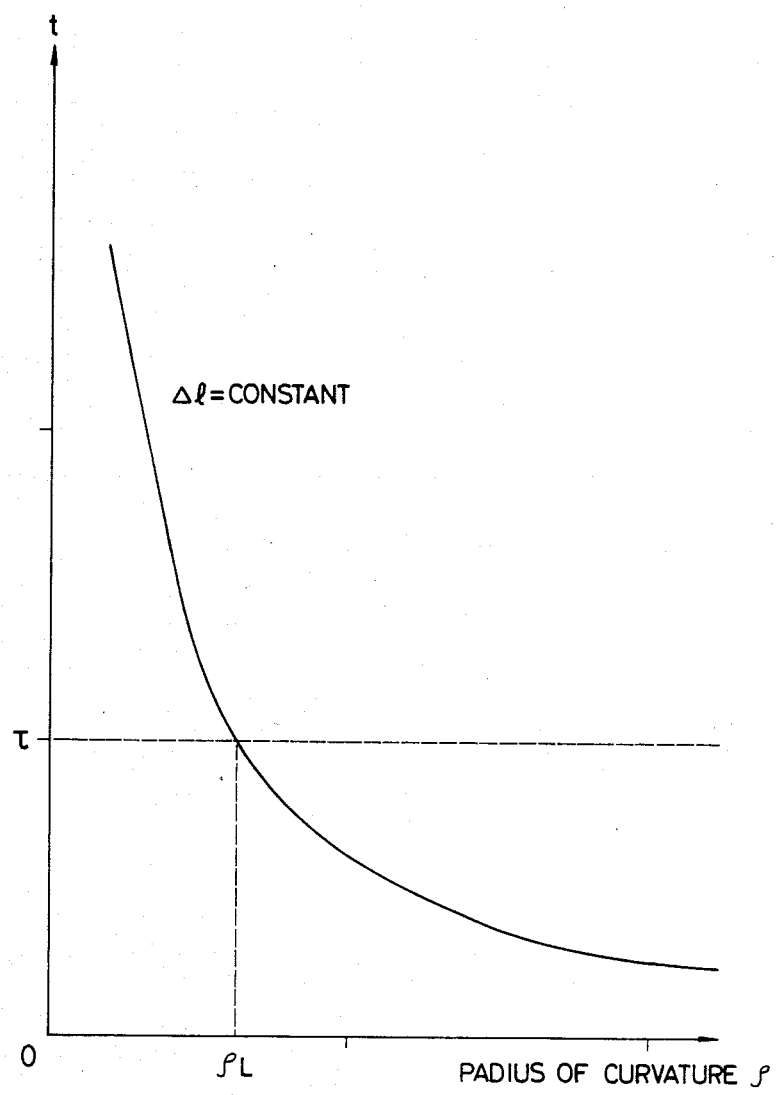
FIG. 11 is a diagram showing the relationship between a tolerance $\tau$ and a radius of curvature $\rho$.

FIG. 11 is illustrative of the relationship between the radius of curvature of the curve and the tolerance at the time the line segment length $\Delta S$ is constant. FIG. 11 shows that for curves having radii of curvature of $\rho_L$ and larger, the tolerance $\tau$, is ensured if they are approximated by the line segment length $l_S$.

Figure 12A:
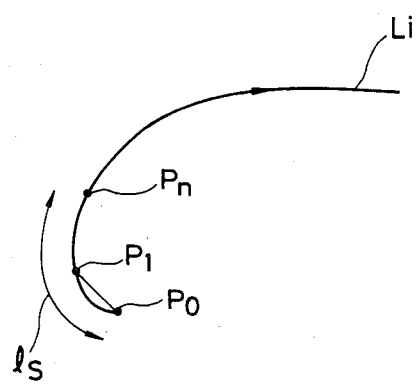
FIGS. 12A, 12B and 13A, 13B are diagrams illustrative of operation of the system of the invention.
Figure 12B:
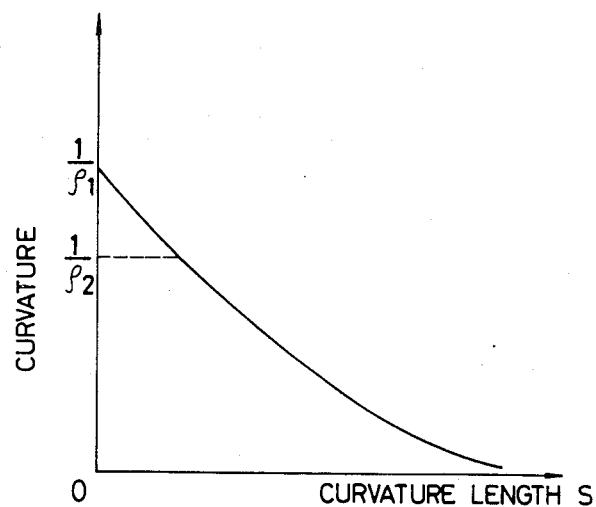

FIG. 12A is explanatory of the case where the curvature of a curve is expressed by a decreasing function (the radius of curvature is an increasing function). The curve Li in FIG. 12A has a curvature gradually decreasing in the direction of the arrow. FIG. 12B is a graph showing the decreasing curvature. The curve has curvatures $K_1$ and $K_2$ at a starting point $P_0$ and a point $P_n$ spaced the search length $l_S$ from the starting point $P_0$ along the curve, with $K_1 > K_2$. The radii of curvature $\rho_1$ and $\rho_2$ have the relation $\rho_1 < \rho_2$. The tolerance $\tau$ can completely be ensured by approximating a partial curve $P_0P_n$ with a line segment having the length of $\Delta S = 2\sqrt{2\rho_1\tau - \tau^2}$ from the equation (3) at the starting point $P_0$. The curve is expressed by a length parameter S, and if the parameter S of $P_0$ is $S_1$, then a next interpolating point is determined as $S_1 + \Delta S$. If this point is determined as $P_1$, then it is clear that $\overline{P_0P_1} < \Delta S$ and the tolerance $\tau$ can be ensured by employing the point $P_1$ as an interpolating point.

Figure 13A:
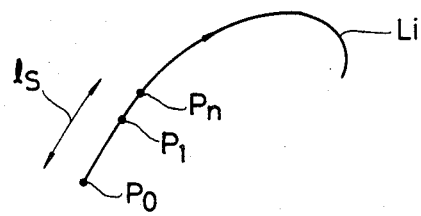
Figure 13B:
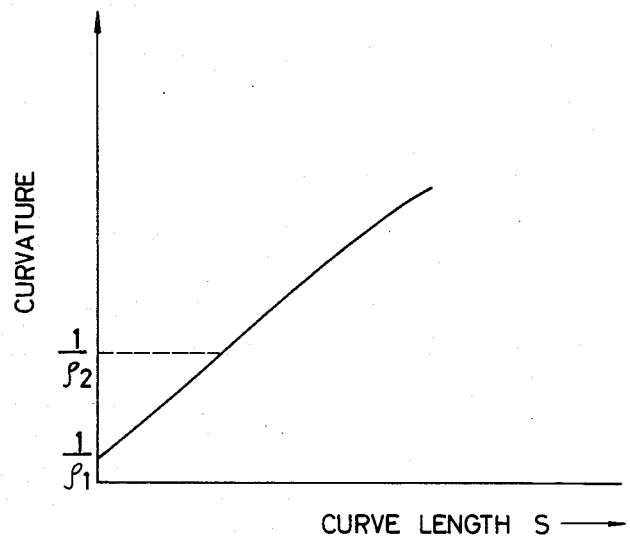

FIG. 13A is explanatory of the case where the curvature of a curve is expressed by an increasing function (the radius of curvature is a decreasing function). The curve Li in FIG. 13A has a curvature gradually increasing in the direction of the arrow. FIG. 13B is a graph showing the decreasing curvature. The curve has curvatures $K_1$ and $K_2$ at a starting point $P_0$ and a point $P_n$ spaced the search length $l_S$ from the starting point $P_0$ along the curve, with $K_1 > K_2$. The radii of curvature $\rho_1$ and $\rho_2$ have the relation $\rho_1 < \rho_2$. The tolerance can completely be ensured by employing the curvature and the radius of curvature at a point $P_h$, establishing the line segment length $\Delta S$ as $\Delta S = 2\sqrt{2\rho_2\tau - \tau^2}$ and determining a line segment from the point $P_0$. The curve is expressed by a length parameter S, and if the parameter S of $P_0$ is $S_1$, then a next interpolating point is determined as $S_1 + \Delta S$. If this point is determined as $p_1$, then it is clear that $\overline{P_0P_1} < \Delta S$, and the tolerance $\tau$ can be ensured by employing the point $P_1$ as an interpolating point.

Where the curvature of the curve is constant, $\Delta S = 2\sqrt{2\rho_1\tau - \tau^2}$ is employed. However, it is apparent that either line segment length may be used.

As described above, in the steps (7) and (8) in FIG. 10, the radii of curvature $K_1$ and $K_2$ are compared, the larger one selected, and the selected radius of curvature established as $K_S$.

In a step (10), a limit radius of curvature $K_L$ is compared with $K_S$ to determine whether the curve to be interpolated is regarded as an arc or a straight line. If regarded as an arc, then a step (11) calculates S from the equation (3). If regarded as a straight line, then a step (12) equalizes $\Delta S$ with $l_S$ (search length). Then, a step (13) increments the curve length by $\Delta S$, and the program goes back to the step (3). The curve given by the foregoing process can be interpolated with the tolerance $\tau$ ensured.

Figure 5:
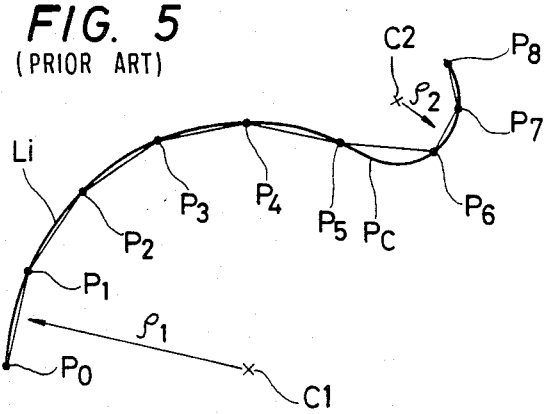
Figure 14:
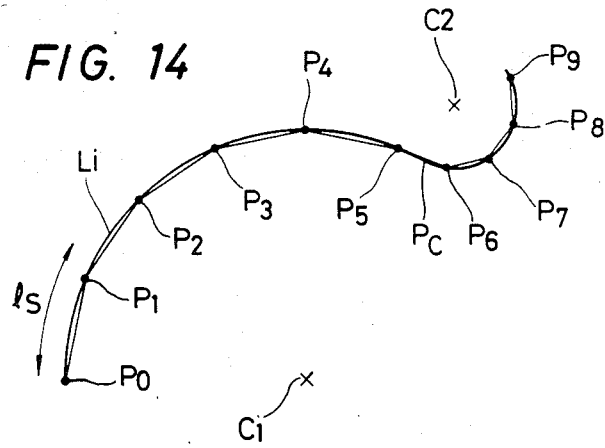
FIGS. 14 and 15 are diagrams explanatory of advantages of the present invention in comparison with the conventional process.

FIG. 14 is explanatory of the present invention in comparison with FIG. 5, and shows a curve composed of an arc having a radius of curvature $\rho_1$ and an arc having a radius of curvature $\rho_2$, the arcs being joined at a point $P_C$. First, curvatures $K_1$ and $K_2$ at a starting point $P_0$ and a point on the curve spaced the search length $l_S$ from the point $P_0$ are calculated. Since $K_1 = K_2 = 1/\rho_1$, a line segment $P_0P_1$ of $S \leq 2\sqrt{2\rho_1\tau - \tau^2}$ is obtained. Likewise, line segments $P_1P_2$, $P_2P_3$, $P_3P_4$ and $P_4P_5$ are obtained. Curvatures $K_1$, $K_2$ at the point $P_5$ and a point on the curve spaced the search length $l_S$ from the point $P_5$ are calculated, and $K_1 < K_2$ since the latter point is positioned on the arc having the radius of curvature $\rho_2$. At this time, a line segment $P_5P_6$ having a length $S \leq 2\sqrt{2\rho_2\tau - \tau^2}$ is obtained. Thus, the shortcoming explained with reference to FIG. 5 is eliminated.

Figure 6:
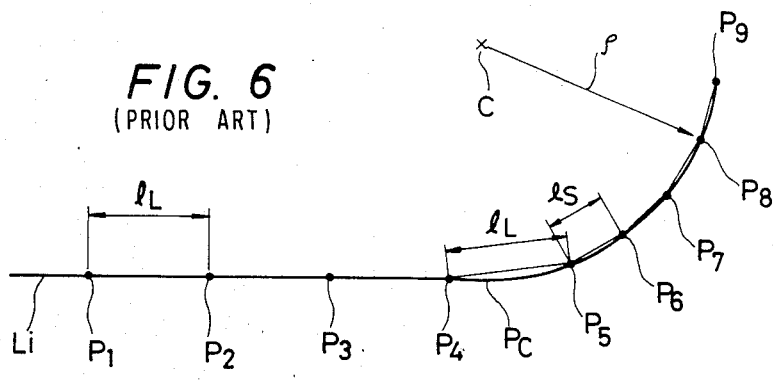
Figure 15:
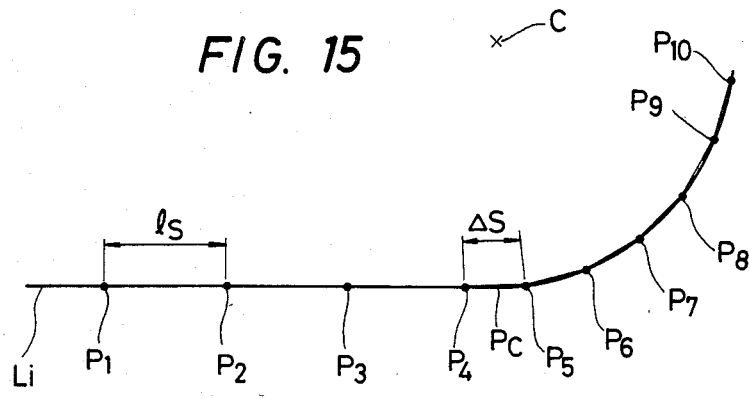

FIG. 15 is illustrative of operation of the system of the invention in comparison with FIG. 6. That is, FIG. 15 is explanatory of interpolation of a curve Li composed of a straight line and an arc having a center of curvature C and a radius of curvature $\rho$, the straight line blending smoothly into the arc at a point $P_C$. Curvatures $K_1$ and $K_2$ at a point $P_1$ and a point $P_2$ on the curve Li spaced the search length $l_S$ from the point $P_1$ are calculated, and both $K_1$ and $K_2$ are found here to be zero. Since it is apparent that $K_1 < K_L = 2\sqrt{2\rho_S\tau - \tau^2}$ the line segment length is equalized with the search length $l_S$, and the point $P_2$ is determined as an interpolating point. Likewise, points $P_3$ and $P_4$ are obtained. Then, curvatures $K_1$ and $K_2$ at the point $P_4$ and a point on the curve Li spaced the search length $l_S$ from the point $P_4$ are calculated, and $K_1 < K_2$. If $K_2 < K_L$ then a point $p_5$ is obtained from $\Delta S = 2\sqrt{2\rho\tau - \tau^2}$. Therefore, the drawback described with reference to FIG. 6 is eliminated.

The curvilinear interpolation system according to the present invention requires the operator to specify a search length as a unit for checking the condition of a curve. The system of the invention is advantageous in that the search length can be handled with greater ease than would be the case with the conventional system in which the operator is required to give a maximum line segment length.

Figure 16A:
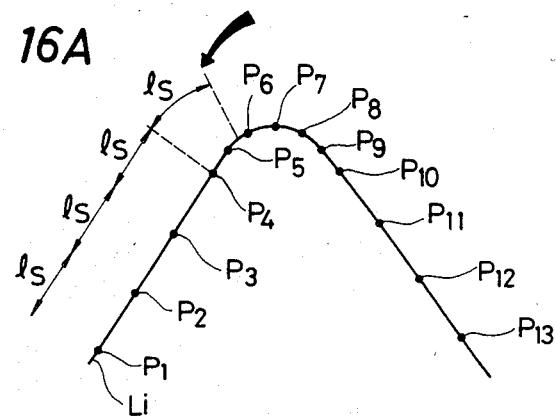
FIGS. 16A and 16B are a set of diagrams illustrative of search lengths $l_S$.
Figure 16B:
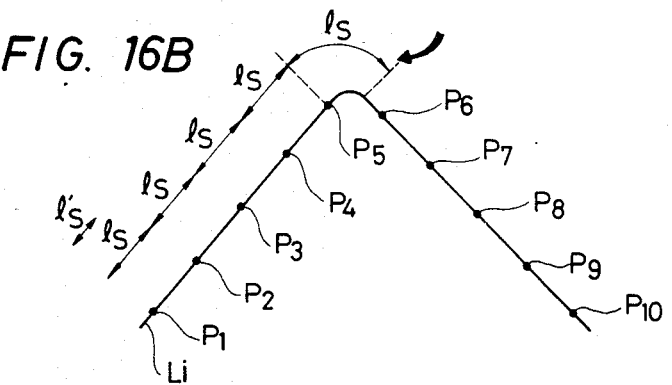

The search length will now be described. When a curve Li of FIG. 16A is checked from the point $P_1$ with a search length $l_S$, a "curved portion" of the curve Li is found at the arrow. Therefore, the entire curve Li is approximated with line segments $P_1$, $P_2$, ..., $P_{13}$ with errors smaller than a desired tolerance. When checking a line Li of FIG. 16B with the same search length $l_S$, no "curved portion" is found at the arrow. Where this search length $l_S$ is used, no error below the desired tolerance is ensured. In this case, a smaller search length $l_S'$ is established to ensure an error below the tolerance.

Although the curvilinear interpolation system of the the present invention has been described with respect to two-dimensional coordinates, the invention is also applicable to any desired curve in three-dimensional space.

In accordance with the curvilinear interpolation system and method of the invention, a curvature $K_1$ is calculated at a current curve interpolating point $P_p$ and a curvature $K_2$ is calculated a point spaced a given search length $l_S$ from the point $P_p$ along the curve, the calculated curvatures are compared, and the respective segment of the curve apportioned with a line segment therealong to determine a next interpolating point. The inventive system and method is thus capable of carrying out curvilinear interpolation at a high speed with a high accuracy through a simple arrangement.

We claim:

1. A curvilinear interpolation system for use in a numerical control apparatus such as a machine tool or a robot having two or more drive axes and capable of moving a movable member while effecting linear interpolation on a given curve with a plurality of line segments, comprising:

means for calculating a curvature $K_p$ of said curve at a current curve interpolating point $P_p$;

means for calculating a curvature $K_n$ near range of a point $P_n$ on said curve spaced a given search length S from the point $P_p$ along the curve;

means for setting $K_s = K_p$ when $K_p \geqq K_n$ and setting $K_s = K_n$ when $K_p < K_n$;

means for comparing said curvature $K_s$ with a limit curvature $K_L$ established for determining whether a curve portion is a straight line or an arc, for establishing said curve portion as an arc having said curvature $K_s$ when $K_s \geqq K_L$ to approximate said curve portion with a line segment so as to fall within an allowable error t and for establishing said curve portion as a straight line when $K_s < K_L$ to approximate said curve portion with a line segment of a prescribed length, so as to define all of said plurality of line segments; and means for moving said movable member along a path defined by said plurality of line segments.

2. A curvilinear interpolation method for use in a numerical control apparatus such as a machine tool or a robot having two or more drive axes and capable of moving a movable member while effecting linear interpolation on a given curve with a plurality of line segments, comprising the steps of:

(1) for each line segment:

calculating a curvature $K_p$ of said curve at a current curve interpolating point $P_p$;

calculating a curvature $K_n$ near range of a point $P_n$ on said curve spaced a given search length S from said point $P_p$ along said curve;

setting $K_s = K_p$ when $K_p \geqq K_n$ and setting $K_s = K_n$;

comparing said curvature $K_s$ with a limit curvature $K_L$ established for determining whether a curve portion is a straight line or an arc for establishing said curve portion as an arc having said curvature $K_s$ when $K_s \geqq K_L$ to approximate said curve portion with a line segment so as to fall within an allowable error t and for establishing said curve portion as a straight line when $K_s < K_L$ to approximate said curve portion with a line segment of a prescribed length; and (2) moving an operative member along a path defined by said plurality of line segments.

* * * * *